United States Patent
Carlson et al.

(10) Patent No.: US 6,952,757 B2
(45) Date of Patent: Oct. 4, 2005

(54) METHOD, SYSTEM, AND PROGRAM FOR MANAGING STORAGE UNITS IN STORAGE POOLS

(75) Inventors: Wayne Charles Carlson, Tucson, AZ (US); James Arthur Fisher, Tucson, AZ (US); Kevin Lee Gibble, Tucson, AZ (US); Gregory Tad Kishi, Oro Valley, AZ (US)

(73) Assignee: International Business Machines Corporation, Armonk, NY (US)

( * ) Notice: Subject to any disclaimer, the term of this patent is extended or adjusted under 35 U.S.C. 154(b) by 182 days.

(21) Appl. No.: 10/230,936

(22) Filed: Aug. 29, 2002

(65) Prior Publication Data

US 2004/0044862 A1 Mar. 4, 2004

(51) Int. Cl.[7] ................................................ G06F 12/00
(52) U.S. Cl. .................... 711/161; 711/111; 711/113; 711/114; 711/154; 711/156; 711/161; 707/200; 707/205; 707/206
(58) Field of Search .................. 711/111, 113, 114, 711/154, 156; 707/200, 205, 206

(56) References Cited

U.S. PATENT DOCUMENTS

| | | |
|---|---|---|
| 4,530,055 A | 7/1985 | Hamstra et al. |
| 5,043,885 A | 8/1991 | Robinson |
| 5,164,909 A | 11/1992 | Leonhardt et al. |
| 5,193,171 A * | 3/1993 | Shinmura et al. ............ 711/113 |
| 5,253,351 A | 10/1993 | Yamamoto et al. |
| 5,390,318 A | 2/1995 | Ramakrishnan et al. |
| 5,412,780 A | 5/1995 | Rushton |
| 5,546,557 A | 8/1996 | Allen et al. |
| 5,584,008 A * | 12/1996 | Shimada et al. ............ 711/114 |
| 5,636,355 A | 6/1997 | Ramakrishnan et al. |
| 5,790,828 A | 8/1998 | Jost |
| 5,829,023 A | 10/1998 | Bishop |
| 5,926,834 A | 7/1999 | Carlson et al. |
| 5,930,827 A * | 7/1999 | Sturges ...................... 711/170 |
| 5,956,301 A | 9/1999 | Dimitri et al. |
| 6,038,490 A | 3/2000 | Dimitri et al. |
| 6,067,599 A | 5/2000 | Kishi et al. |

(Continued)

OTHER PUBLICATIONS

U.S. Appl. No. 10/230,612, filed Aug. 29, 2002, entitled "Method, System, and Program for Transferring Data", by inventors K.L. Gibble et al.

(Continued)

*Primary Examiner*—Mano Padmanabhan
*Assistant Examiner*—Mehdi Namazi
(74) *Attorney, Agent, or Firm*—David W. Victor; Konrad Raynes & Victor LLP

(57) ABSTRACT

Provided are a method, system, and program for managing storage units. Storage pool information indicates an assignment of a plurality of storage units to a plurality of storage pools, wherein each pool is assigned zero or more storage units, and wherein data associated with one storage pool is stored in at least one storage unit assigned to the storage pool. User selection is received to move at least one storage unit to a target storage pool. A determination is made of at least one storage unit assigned to a source storage pool to move to the target storage pool. The storage pool information is updated to indicate the determined at least one selected storage unit as assigned to the target storage pool.

37 Claims, 11 Drawing Sheets

U.S. PATENT DOCUMENTS

| | | | |
|---|---|---|---|
| 6,163,773 | A | 12/2000 | Kishi |
| 6,304,880 | B1 | 10/2001 | Kishi |
| 6,336,163 | B1 | 1/2002 | Brewer et al. |
| 6,339,778 | B1 | 1/2002 | Kishi |
| 6,351,685 | B1 | 2/2002 | Dimitri et al. |
| 2001/0001870 | A1 | 5/2001 | Ofek et al. |
| 2003/0079019 | A1 * | 4/2003 | Lolayekar et al. .......... 709/226 |
| 2004/0044854 | A1 * | 3/2004 | Gibble et al. ................ 711/154 |

OTHER PUBLICATIONS

U.S. Appl. No. 10/230,639, filed Aug. 29, 2002, entitled "Method, System, and Article of Manufacture for Managing Storage Pools" by inventors G.T. Kishi et al.

U.S. Appl. No. 10/230,522, filed Aug. 29, 2002, entitled "Method, System, and Article of Manufacture for Returning Physical Volumes" by inventors G.T. Kishi et al.

U.S. Appl. No. 10/231,816, filed Aug. 29, 2002, entitled "Method, System, and Article of Manufacture for Borrowing Physical Volumes" by inventors G.T. Kishi et al.

U.S. Appl. No. 10/230,789, filed Aug. 29, 2002, entitled "Method, System, and Program for Managing and Out of Available Space Condition" by inventors K. L. Gibble et al.

U.S. Appl. No. 10/231,815, filed Aug. 29, 2002, entitled "Method, System, and Program for Moving Data Among Storage Units" by inventors G.T. Kishi et al.

M. Werner, et al., "Magstar Peer–To–Peer Virtual Tape Server Planning and Implementation Guide", IBM Corp., Dec. 2000, Chapters 1 and 2.

IBM Corp., "Logical Grouping of Data Storage Media in a Library System", Technical Disclosure Bulletin, vol. 35, No. 5, Oct. 1992, pp. 17–20.

* cited by examiner

Logical Volume Record

Physical Volume Record

Pool Record

US 6,952,757 B2

METHOD, SYSTEM, AND PROGRAM FOR MANAGING STORAGE UNITS IN STORAGE POOLS

BACKGROUND OF THE INVENTION

1. Field of the Invention

The present invention relates to a method, system, and program for managing storage units in storage pools.

2. Description of the Related Art

In a tape library system, a tape controller will perform a reclamation process to improve the utilization of the tape storage units. The reclamation process involves copying active data from one or more tapes having both inactive and active data to fewer tapes that only have active data. The tapes from which the data is copied are then added to a scratch pool of available tapes from which they may be selected and used to store future data. Empty tapes may be returned to a scratch pool or retained for exclusive use of the current pool. This process improves storage capacity utilization by aggregating active data from multiple tapes to a single tape that stores a greater percentage of active data. Reclamation is necessary because as data is modified, older versions of the data on various tapes becomes outdated or inactive. Tapes that have both inactive and active data are not fully utilized because data is written sequentially and inactive data cannot simply be replaced with active data.

Notwithstanding the prior art techniques for managing data across multiple tapes, there is a need for improved techniques for managing data stored in multiple tape cartridges.

SUMMARY OF THE DESCRIBED IMPLEMENTATIONS

Provided are a method, system, and program for managing storage units. Storage pool information indicates an assignment of a plurality of storage units to a plurality of storage pools, wherein each pool is assigned zero or more storage units, and wherein data associated with one storage pool is stored in at least one storage unit assigned to the storage pool. User selection is received to move at least one storage unit to a target storage pool. A determination is made of at least one storage unit assigned to a source storage pool to move to the target storage pool. The storage pool information is updated to indicate the determined at least one selected storage unit as assigned to the target storage pool.

In further implementations, the storage units associated with one storage pool may include a class of data that is associated with the storage pool, wherein the source and target storage pools are associated with different classes of data.

Still further, a reclaim operation may be scheduled with the source storage unit if the source storage unit includes active data.

A determination may be made as to whether user selection indicates a priority move. If so, the reclaim operation may be performed with respect to the source storage unit at a higher priority than other storage units being reclaimed during a scheduled reclaim period.

Further provided are a method, system, and program for reclaiming a storage unit. Selection is made of a source storage unit to reclaim to an storage unit. Active data in the source storage unit is copied to the storage unit. A determination is made as to whether the source storage unit is subject to a move operation to move the source storage unit from a first storage pool to a second storage pool, wherein the first and second storage pools include storage units having active data. Indication is made that the source storage unit is in the second storage pool if the source storage unit is subject to the move operation.

In further implementations, if the source storage unit is not subject to a move operation, then a determination is made as to whether the source storage unit was borrowed from a home storage pool. If so, the source storage unit is associated with the home storage pool.

Described implementations provide techniques for managing storage units in storage pools and moving storage units, such as tape cartridges, from one pool to another.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
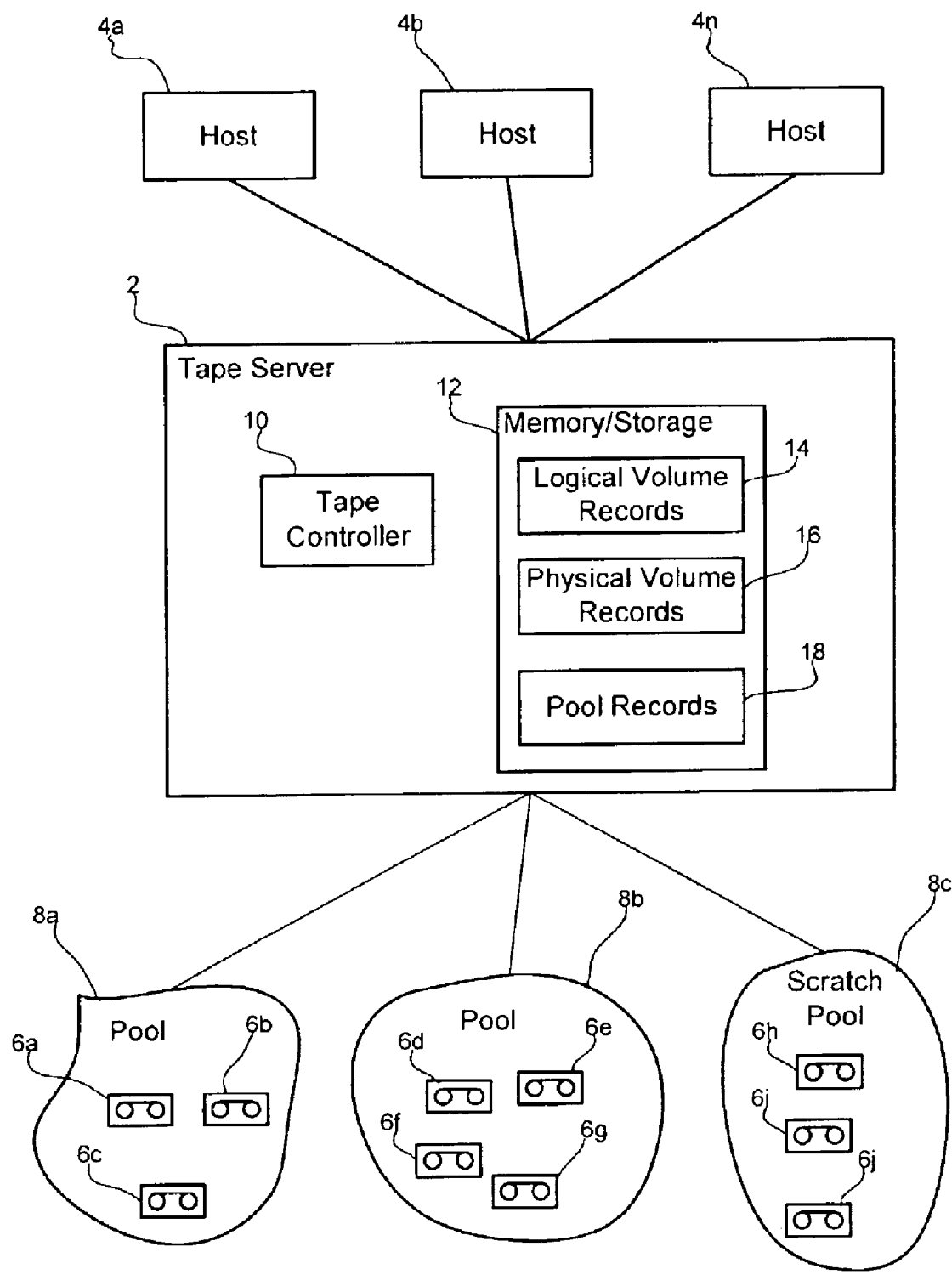
FIG. 1 illustrates a computing environment in which aspects of the invention are implemented.

FIG. 1 illustrates a computing environment in which aspects of the invention may be implemented. A tape server 2 provides host systems 4a, 4b . . . 4n access to logical volumes stored on tape cartridges (also referred to as physical volumes) 6a, 6b, 6c, 6d, 6e, 6f, 6g. In certain implementations, the tape cartridges 6a, 6b . . . 6g are organized into logical groups referred to as pools 8a, 8b. A tape controller 10 includes hardware and/or software to manage access to the tape cartridges 6a, 6b . . . 6g in the pools 8a, 8b and perform reclamation in accordance with implementations described herein. A scratch pool 8c includes tape cartridges 6h, 6i, and 6j that are empty, free and available for use with another pool if additional tape storage is needed for logical volumes in a pool.

Although FIG. 1 shows a certain number of tape cartridges and storage pools, any number of tape cartridges and storage pools may be used, where the storage pools may include any number of tape cartridges. The tape server 2 may comprise an automated tape library and include a gripper assembly (not shown) to access and load the tape cartridges 6a, 6b . . . 6j into one or more accessible tape drives (not shown) and include cartridge slots (not shown) to store the tape cartridges. In further implementations, the tape cartridges may be manually loaded into one or more tape drives accessible to the tape server 2.

The tape server 2 may comprise any tape library or tape controller system known in the art. The tape cartridges 6a, 6b . . . 6j may comprise any type of sequential access magnetic storage media known in the art, including Digital Linear Tape (DLT), Linear Tape Open (LTO), etc. The hosts 4a, 4b . . . 4n may comprise any computing device known in the art, such as a personal computer, laptop computer, workstation, mainframe, telephony device, handheld computer, server, network appliance, etc. The hosts 4a, 4b . . . 4n may connect to the tape server 2 via a direct cable connection or over a network, such as a Local Area Network (LAN), Wide Area Network (WAN), Storage Area Network (SAN), the Internet, an Intranet, etc.

System administrators can assign physical volumes to pools to allow classification of tapes according to some predefined criteria. For instance, in an organization, there may be separate storage pools of tape cartridges for different units within the organization. In a corporate organization, there may be separate storage pools for different departments, e.g., accounting, marketing, finance, engineering, etc., so that data from a particular department is stored on tape cartridges that only store that particular class of data. Alternatively, storage pools may be defined for data having different rates of usage. For instance, one pool may be for data that has been modified or accessed recently and another pool may be used for archived or backup data. Still further, pools may be designated for different groups of users, such as those with a high level of access, those with limited access, etc. Thus, the storage pools may be used to assign tape cartridges to be used for specific classes or types of data.

In certain implementations, the tape controller 10 maintains data structures in memory 12, including logical volume records 14, physical volume records 16, and pool records 18. The memory 12 may comprise a volatile memory device, e.g., a random access memory (RAM) or a non-volatile storage, e.g., a hard disk drive. These records may be maintained in a relational or object oriented database, a table or any other data structure known in the art.

Figure 2A:
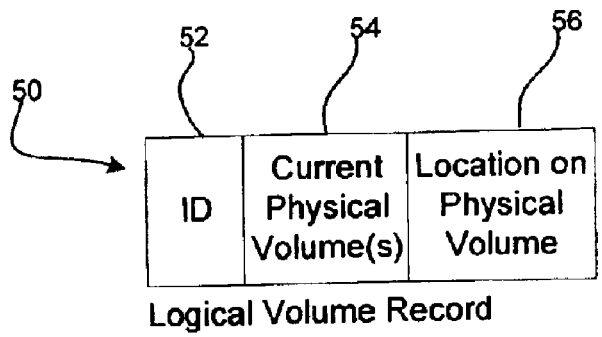
FIGS. 2a, 2b, and 2c illustrate data structures maintaining information on logical volumes, physical volumes and storage pools, respectively, in accordance with implementations of the invention.

FIG. 2a illustrates the information maintained in each logical volume record 50, where a logical volume record 50 is maintained for each logical volume stored in a tape cartridge 6a, 6b . . . 6g, including:

ID 52: an identifier of the logical volume.

Current Physical Volumes 54: identifies one or more physical volumes (tape cartridge 6a, 6b . . . 6j) including the logical volume. A logical volume may span multiple physical volumes or multiple logical volumes may be stored on a single physical volume. The pool in which the logical volume is assigned can be determined from the storage pool associated with the current physical volume including the logical volume.

Location on Physical Volume(s) 56: indicates the location of the logical volume on the one or more physical volumes including the logical volume.

Figure 2B:
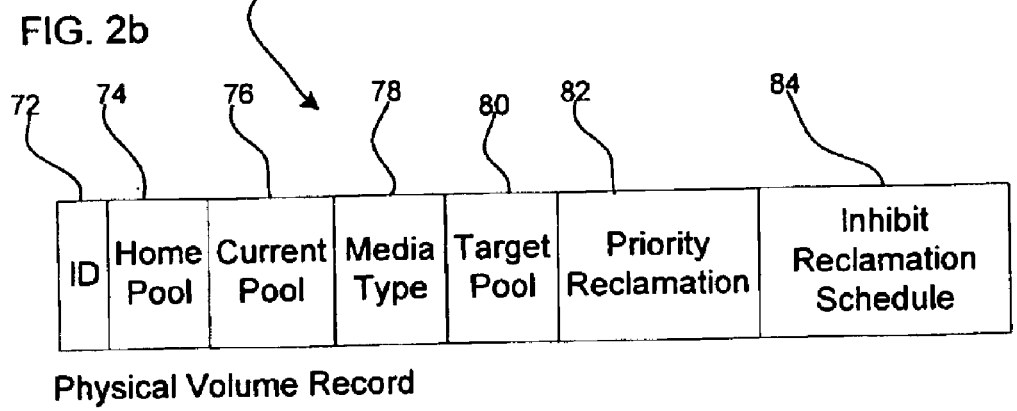

FIG. 2b illustrates the information in each physical volume record 70, where a physical volume record 70 is maintained for each physical volume or tape cartridge 6a, 6b . . . 6j that may be accessed by the tape server 2 through a tape drive, including:

ID 72: provides a unique identifier of a physical volume.

Home Pool 74: indicates the home pool to which the physical volume is assigned. If a physical volume (tape cartridge) is moved from one pool to another, than the home pool is reassigned to the target pool to which the physical volume is reassigned. A "borrow" changes only the current pool and the home pool remains the same. If a tape cartridge is borrowed two or more times, then the home pool will still specify the same pool from which the tape was initially borrowed, such as the scratch pool, but the current pool is changed.

Current Pool 76: indicates the current pool to which the physical volume is assigned, such that a physical volume stores data of the type associated with the current pool.

Media Type 78: indicates a media type of the physical volume, such as "J" or "K".

Target Pool 80: the default indicates no target pool. If the field indicates a known storage pool, then this field indicates that the physical volume is involved in a pending move operation and is to be moved to the specified target pool after the active data from the physical volume is copied to an empty tape.

Priority Reclamation 82: indicates that reclamation for the physical volume occurs during the scheduled reclamation period, but the physical volume is assigned a higher reclamation priority than other cartridges to be reclaimed so that the physical volume is scheduled for reclamation before other tape cartridges to be reclaimed. The default may be that priority reclamation is off indicating that reclamation will occur during a normally scheduled reclamation period at the normal assigned reclamation priority.

Inhibit Reclamation Schedule 84: If the priority reclamation 82 indicates a priority reclamation, then this field may indicate to schedule the reclamation immediately, even if reclamation would occur outside of the scheduled reclamation period during a critical use time. If this inhibit option is not selected, then the priority reclamation would occur during the normal scheduled reclamation period.

Figure 2C:
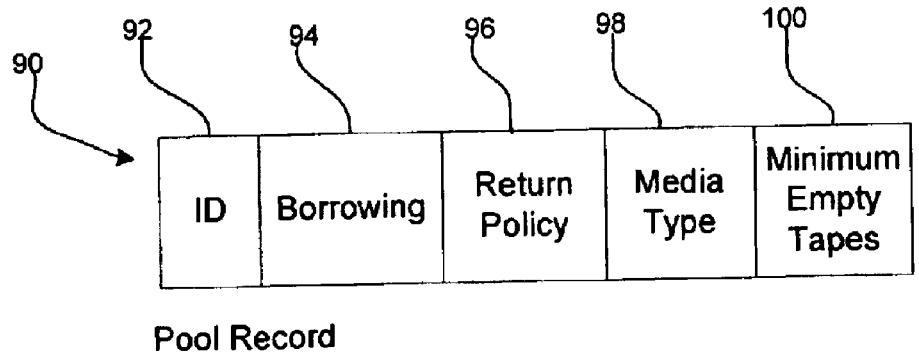

FIG. 2c illustrates the information maintained with a pool record 90, where there is one pool record 90 for each defined pool, including:

ID 92: provides a unique identifier of a pool. This ID may have a descriptive name indicating the type or class of data stored in the pool, e.g., accounting data, marketing data, research and development, archival data, high security users, etc. If a pool record 90 is maintained for the scratch pool, then the scratch pool may have a unique scratch pool identifier.

Borrowing 94: indicates whether physical volumes (tape cartridges) may be borrowed by the pool from the scratch pool.

Return Policy 96: indicates whether a physical volume (tape cartridge) moved from one pool to another must be returned to the home pool when the tape is reclaimed or released, i.e., the tape no longer has any active data.

Media Type 98: a field that indicates the media type(s) of physical volumes associated with the pool.

Minimum Empty Tapes 100: Indicates the minimum number of empty tapes that must be assigned to the pool in order to be immediately available for new data written to the pool.

Figure 3:
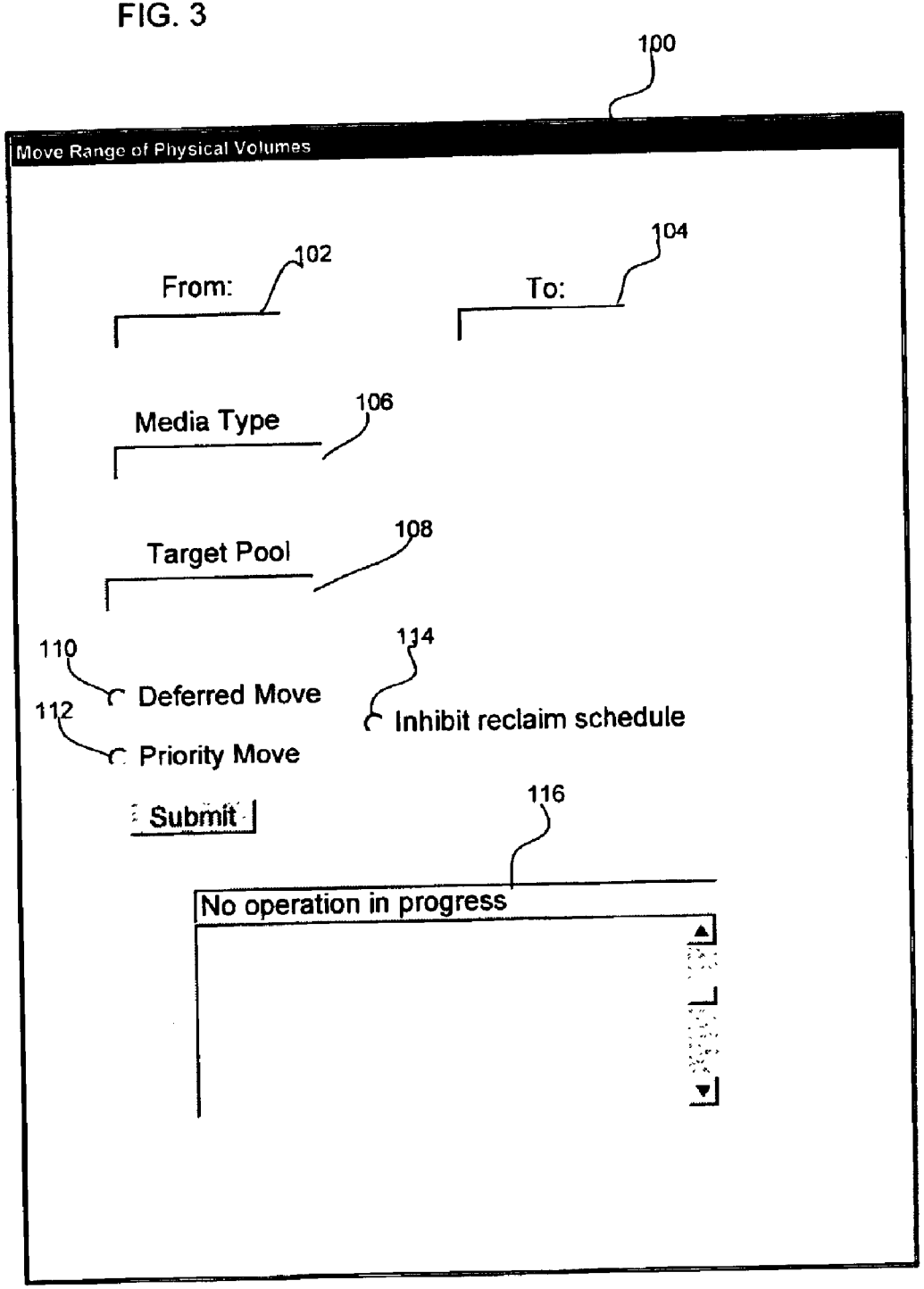
FIGS. 3, 7, and 9 illustrate graphical user interfaces (GUIs) through which an administrator may perform storage pool management operations in accordance with implementations of the invention.
Figure 7:
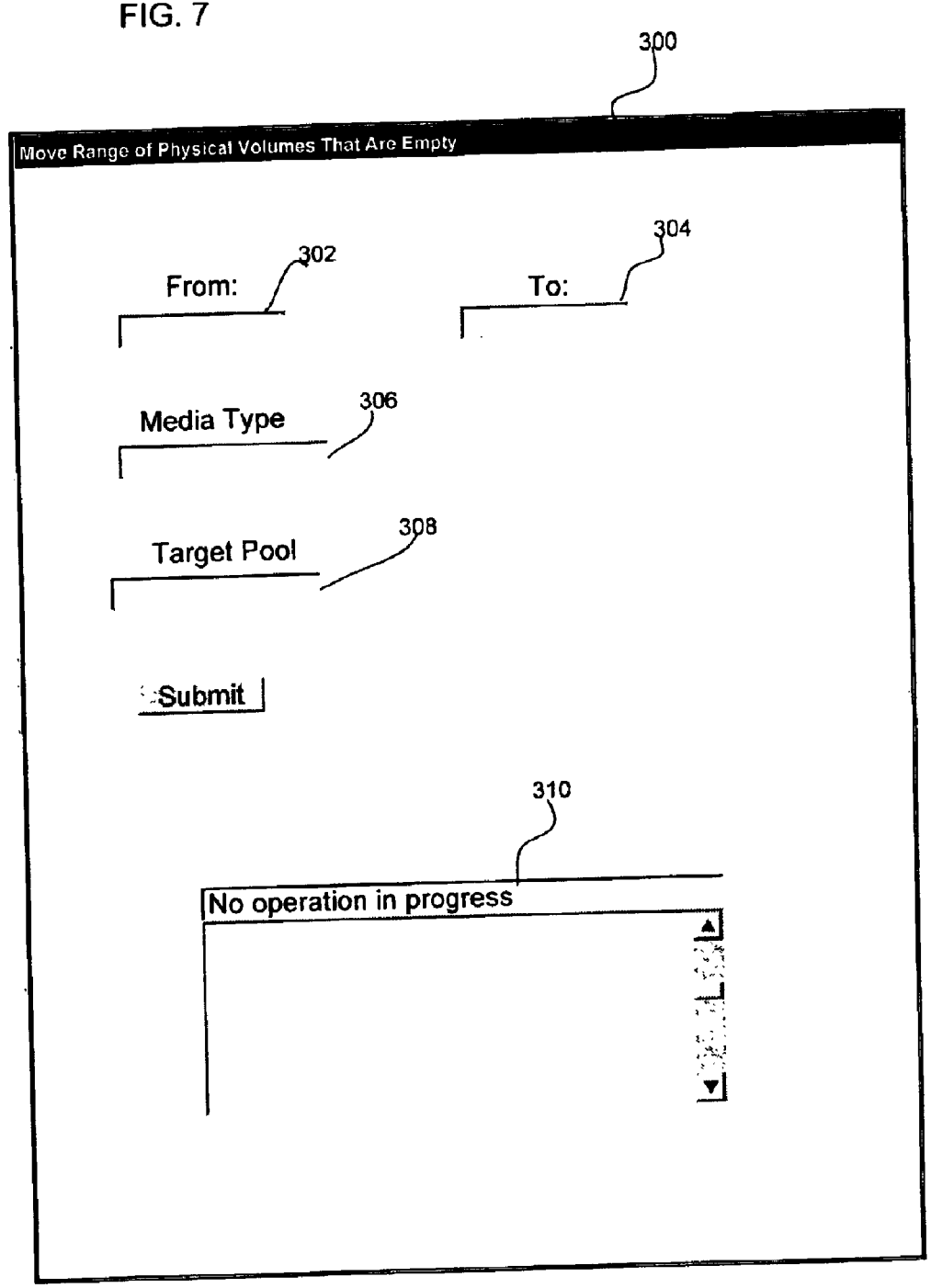
Figure 9:
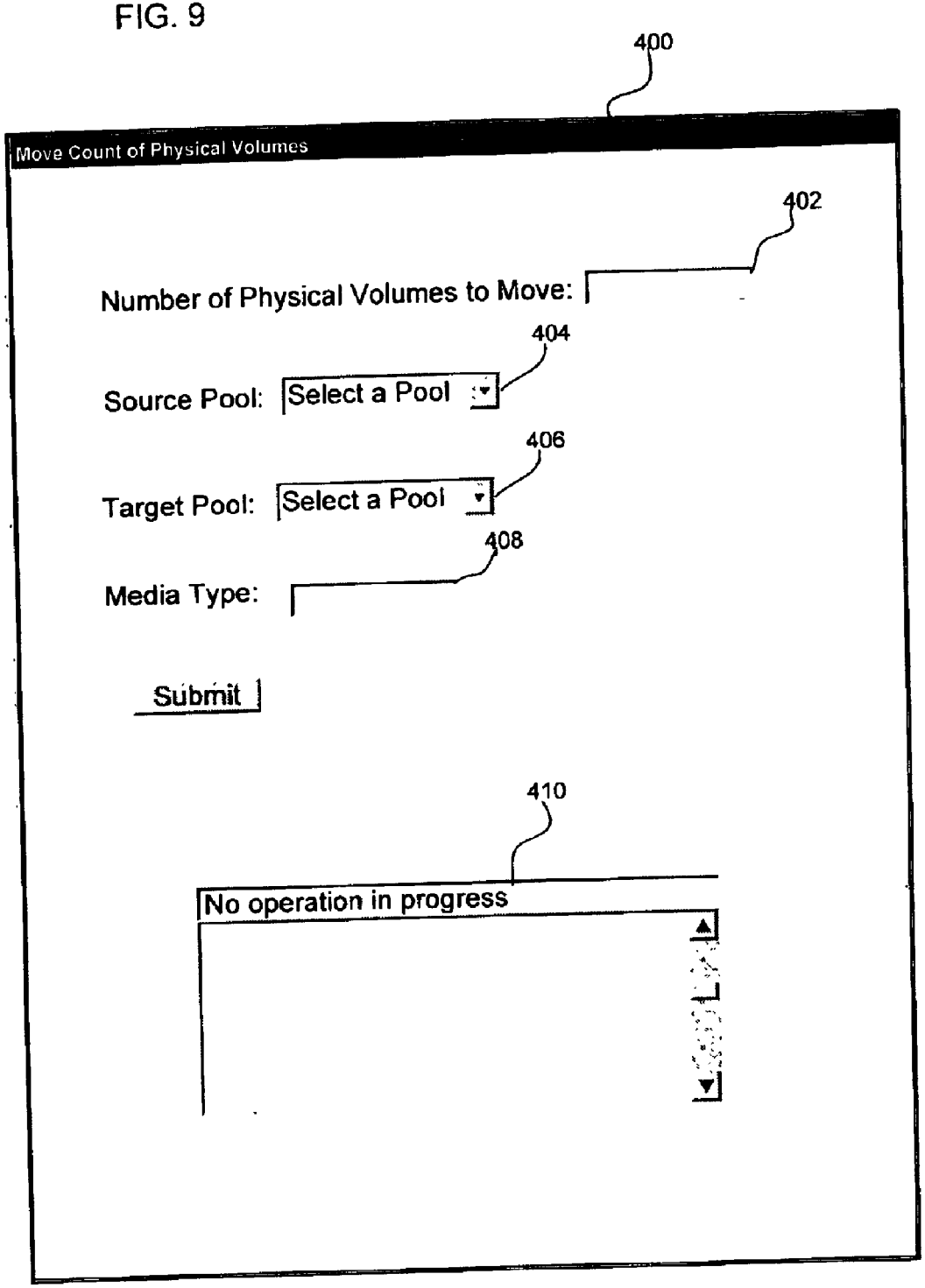

In certain implementations, a system administrator may move physical volumes from one storage pool to another when managing the tape cartridges in the storage pools. This may be performed if a determination is made that one storage pool needs additional tapes due to an anticipated increase of data maintained in that pool, or one pool needs fewer tape cartridges due to an anticipated decrease in data directed toward that pool. FIGS. 3, 7, and 9 illustrate different graphical user interface (GUI) panels presented by the tape controller 10 logic to enable the systems administrator to transfer or move tape cartridges 6a, 6b . . . 6j (physical volumes) from one pool to another.

FIG. 3 illustrates a GUI panel 100 to allow the administrator to specify a range of physical volumes in the "From" and "To" fields 102, 104 of a selected media type 106 to move to a user selected target pool 108. The user selectable media type field 106 may indicate one or more allowable media types, up to all types. Alternatively, the user may select a predefined list of physical volumes to move to the target pool 108. The administrator may also select how the move will affect operations by indicating:

a deferred move 110, which indicates that the move will not occur for those physical volumes including active data until a regularly scheduled reclamation operation occurs. In certain implementations, a reclamation operation is performed with respect to a tape cartridge when the percentage of available space on the cartridge, i.e., the percent of the tape not filled with active data, exceeds a predefined reclamation threshold. Once the available or unused space on a tape cartridge reaches the reclamation threshold, the tape controller 10 moves the active data to another tape cartridge and makes reclaimed tape cartridge free to be used for new writes.

a priority move 112 is set to perform the reclamation of the tapes being moved ahead of other tapes scheduled for reclamation.

an inhibit reclaim schedule move 114: This box may be selected when selecting the priority move 112 box in order to specify whether the tape reclamation schedule is honored. A tape reclamation schedule indicates "critical time periods", such as anticipated high data access time periods, during which reclamation cannot occur. For instance, the administrator may schedule certain high use periods as critical so that reclamation will not occur during such critical periods even if a reclamation condition has been satisfied. This is to ensure that reclamation occurs during regularly scheduled low use periods, because reclamation utilizes substantial tape server 2 resources and could significantly effect host 4a, 4b . . . 4n operations. If box 112 is checked, but 114 is not, then the priority reclamation of the tapes being moved only occurs during a regularly scheduled reclamation outside of any designated critical time periods. However, if the box 114 is checked to inhibit the reclamation schedule, then the reclamation may occur outside of the designated time period for reclamation, and may occur immediately after the reclamation threshold is satisfied even if the threshold is reached during a critical time period.

The status area 116 is used to indicate the status of the movement operation, and may list the status of the move with respect to each physical volume included within the range of selected physical volumes, e.g., in fields 100 and 102. Further, a progress bar may be displayed indicating the percentage of the move operation that has completed.

Figure 4:
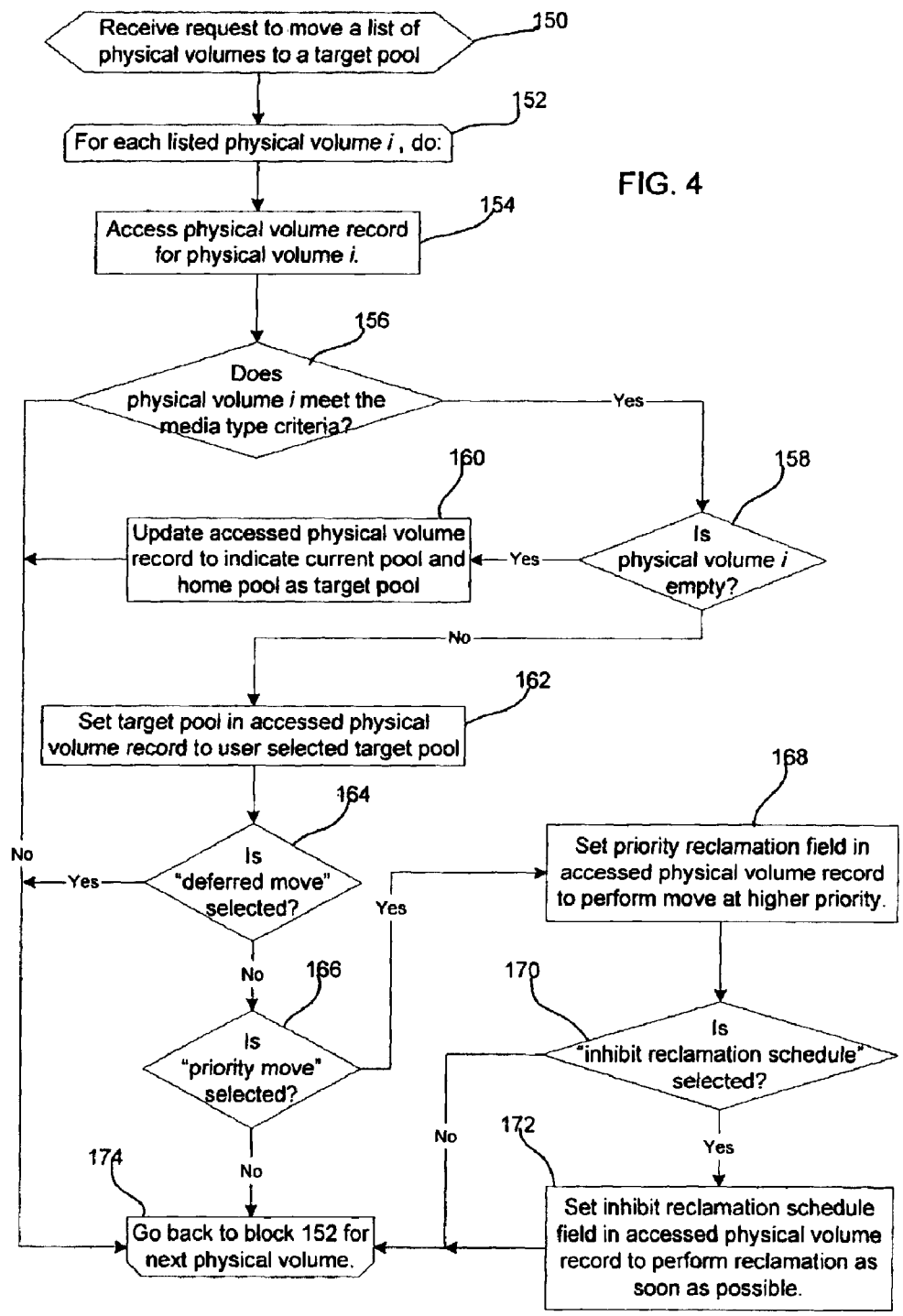
FIGS. 4, 8, and 10 illustrates logic to implement a user invoked storage management operation in accordance with implementations of the invention.

FIG. 4 illustrates logic implemented in the tape controller 10 to move a list of physical volumes to a target pool, where the physical volumes, media type, and target pool may be entered through the GUI panel 100 shown in FIG. 3. Control begins at block 150 upon receiving the request to move a list of physical volumes to a target pool 108 (FIG. 3). For each listed physical volume i, a loop is performed at blocks 152 through 174. At block 154, the physical volume record 70 for physical volume i is accessed. If (at block 156) the media type indicated in media type field 78 of the accessed physical volume record meets the media type 106 (FIG. 3) criteria, then a determination is made (at block 158) whether the physical volume i is empty. If so, then the physical volume i is immediately moved to the target pool by updating (at block 160) the accessed physical volume record to indicate the home pool 74 and current pool 76 (FIG. 2b) as the target pool 108.

Otherwise, if (at block 158) the physical volume i is not empty, then the data in the physical volume i must be reclaimed before being moved. In such case, the target pool field 80 in the accessed physical record 70 is set (at block 162) to the user selected target pool 108. If (at block 164) the "deferred move" option 110 is selected, then the move will occur when the physical volume i is subject to reclamation according to normal reclamation procedures. If (at block 166) the "priority move" option is selected, then the priority reclamation field 82 is set (at block 168) in the accessed physical volume record 70 to indicate that the reclamation occurs at a higher priority level. If (at block 170) the "inhibit reclamation schedule" option 114 is selected with the "priority move" option 112, then the "inhibit reclamation schedule" field 84 (FIG. 2b) is set (at block 172) to indicate that the reclamation will be performed outside of the reclamation schedule. In certain implementation, if the "inhibit reclamation schedule" field 84 is set, reclamation may be performed immediately or at some more immediate time than the scheduled reclamation time period. If the "priority reclamation" field 82 is set, but not "inhibit reclamation" 84, then the reclamation of physical volume i is performed at a higher priority during the normal reclamation schedule. After processing physical volume i at block 156, 160, 164, 170 or 172, control proceeds to block 174 to consider the next physical volume on the list.

Figure 5:
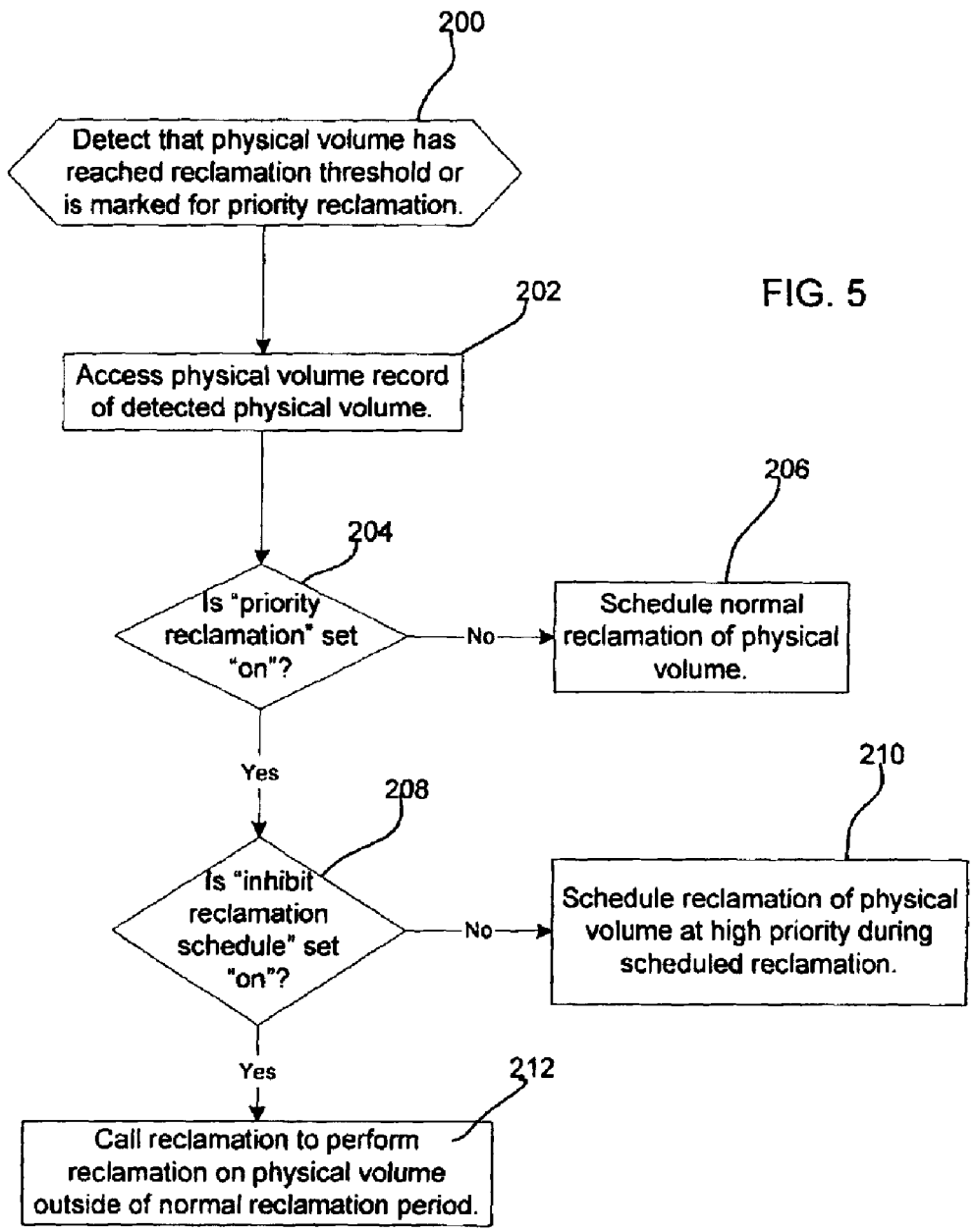
FIGS. 5 and 6 illustrates logic to perform a tape reclamation operation in accordance with implementations of the invention.

FIG. 5 illustrates logic implemented in the tape controller 10 when a physical volume 6a, 6b . . . 6g has reached a reclamation threshold, e.g., the amount of inactive data versus active data on the tape has reached a threshold or when the physical volume has been marked for priority reclamation. Control begins at block 200 when the reclamation threshold is reached for a physical volume or priority reclamation is specified. In response, the tape controller 10 would access (at block 202) the physical volume record 70 (FIG. 2b) of the detected physical volume. If (at block 204) the "priority reclamation" field 82 in the accessed physical volume record 70 is not "on", then the tape controller 10 schedules (at block 206) a normal reclamation of the physical volume. Otherwise, if (at block 204) "priority reclamation" 82 is set and if (at block 208) "inhibit reclamation schedule" is also set, then the tape controller 10 calls (at block 212) reclamation to perform reclamation on the detected physical volume independent of the normally scheduled reclamation period. Otherwise, if (at block 204) only "priority reclamation" 82 is set "on" but not the "inhibit reclamation schedule 84, then the tape controller 10 schedules (at block 210) reclamation of the detected physical volume 6a, 6b . . . 6j at a higher priority than other scheduled reclamations to cause the reclamation of the detected physical volume to occur before other physical volumes during the normally scheduled reclaim period.

Figure 6:
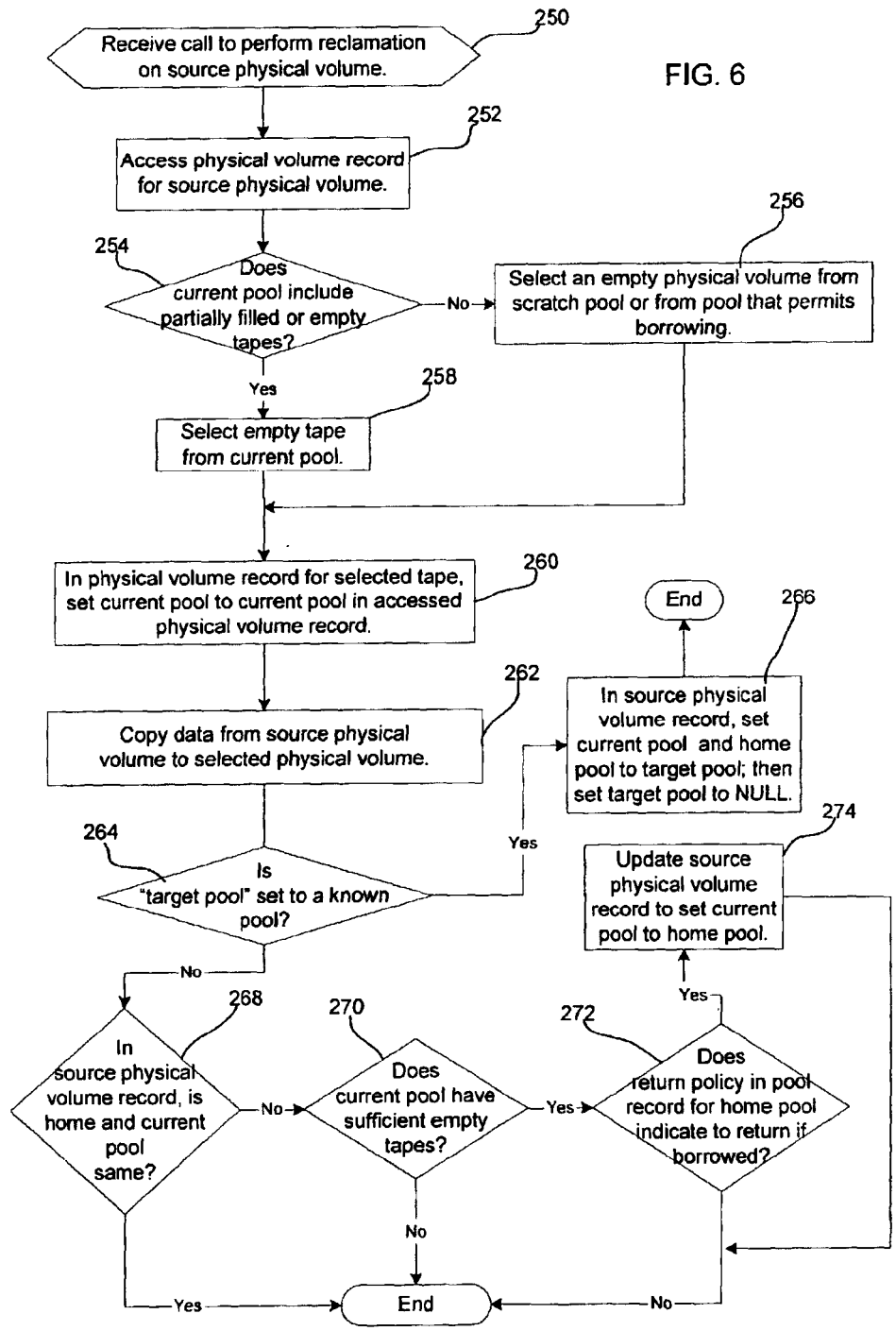

FIG. 6 illustrates logic implemented in the tape controller 10 to perform a reclamation of a source physical volume, which may be called during the scheduled reclamation period or called outside of such period from block 212 in FIG. 5. Upon (at block 250) receiving the call to reclaim, the tape controller 10 accesses (at block 252) the physical volume record 70 (FIG. 2b) for the source physical volume. If (at block 254) the current pool of the physical volume to reclaim, which is indicated in the current pool field 76 indicated in the accessed physical volume record 70 (FIG. 2b), does not include an empty or partially filled physical volume, then the tape controller 10 selects (at block 256) an empty physical volume from the scratch pool 8c or another pool 8a, 8b (FIG. 1). Otherwise, if the current pool 8a, 8b including the tape to reclaim does include empty or partially filled tapes, one tape is selected (at block 258) from the current pool.

After selecting a tape at block 256 or 258, the current pool field 76 for the selected tape is set (at block 260) to the current pool field 76 of the source physical volume record because the active data being copied from the reclaimed tape remains in the same storage pool. The data from the source physical volume is copied (at block 262) to the selected tape. In this way, although the tape cartridge 6a, 6b . . . 6j itself is assigned to a new storage pool, the data in the tape cartridge at the time of the move remains in the same storage pool.

If (at block 264) the source physical volume being reclaimed is subject to a move operation, which is indicated if the "target pool" field 80 (FIG. 2b) for the accessed physical volume record is set to a known pool, then in the source physical volume record 70, the home field 74 and current pool field 76 are set (at block 266) to the target pool, as indicated in the target pool field 80 of the source physical volume record. The target pool field 80 of the selected tape is then set to null, because setting the home pool field 74 to the target pool field 80 logically completed the pending movement operation. If (at block 264) the source physical volume is not subject to a move operation, then a determination is made (at block 268) as to whether the source physical volume was borrowed from another pool, which is so if the home pool 74 and current pool 76 fields in the accessed source physical volume record are different. If the source physical volume being reclaimed is borrowed, then a determination is made (at block 270) as to whether the current pool has the minimum number of tapes 100 (FIG. 2c). As mentioned, a minimum number of empty tapes may be required to maintain for each pool. If the current pool has the minimum number of empty tapes, then a determination is made (at block 272) as to whether the borrowed tape may be returned to the home pool. A tape may be returned if the return policy field 96 in the pool record 90 (FIG. 2c) for the home pool from which the source physical volume was borrowed indicates to return. If (at block 272) the tape must be returned, then the tape controller 10 updates (at block 274) the source physical volume record 76 to set the current pool as the home pool, indicating that the borrowed tape has returned to its home pool. Otherwise, if (at block 270) the current pool has less than the number of specified minimum empty tapes 100 or if (at block 272) the return policy 96 does not require return, control ends.

Thus, the logic of FIG. 6 associates the data on a reclaimed tape cartridge with another pool to complete the move when the data is being reclaimed. Further, if the reclaimed source physical volume was borrowed from another home pool which requires the return of borrowed tape cartridges, then that borrowed tape may be returned to the home pool by updating the current pool to indicate the home pool of the borrowed physical volume.

FIG. 7 illustrates a GUI panel 300 for a system administrator to use when selecting a list or range of physical volumes to move 302 and 304 to a target pool 308 if such tape cartridges are empty. The GUI panel 300 includes user selectable fields 302, 304, 306, and 308 that are the same as fields 102, 104, 106, and 108 in GUI panel 100, respectively.

Figure 8:
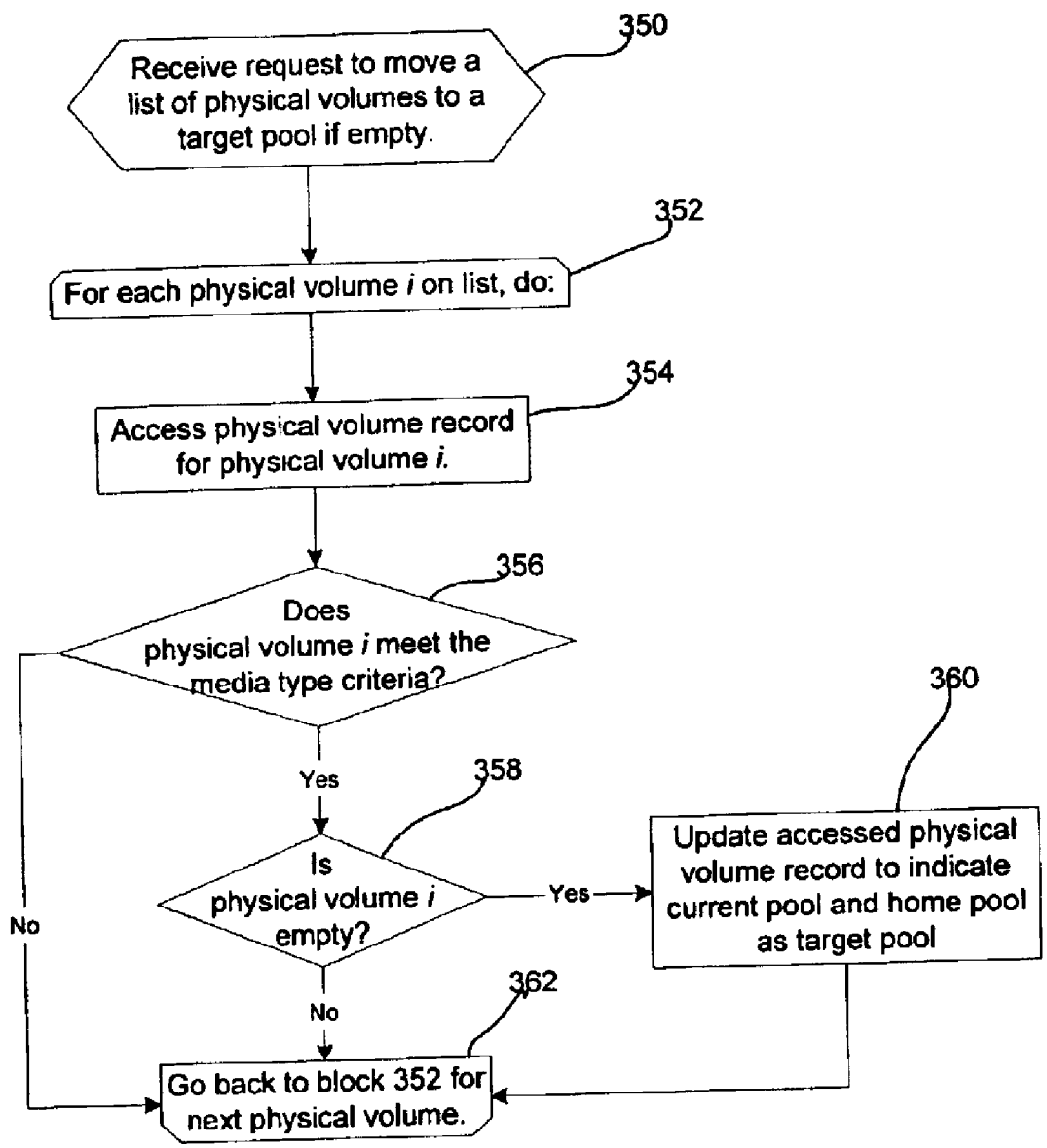

FIG. 8 illustrates the operations the tape controller 10 performs when moving a list of physical volumes 6a, 6b . . . 6j that are empty to a target pool 308 (FIG. 7). Upon receiving (at block 350) a request to move a list of physical volumes that are not empty, which may be received through the GUI panel 300 (FIG. 7), a loop is performed at blocks 352 through 362 for each physical volume i on the list. At block 354, the tape controller 10 accesses the physical volume record for physical volume i. If (at block 356) the media type indicated in media type field 78 (FIG. 2b) of the accessed physical volume record meets the media type 306 criteria (FIG. 7), then a determination is made (at block 358) whether the physical volume i is empty. If so, then the physical volume i is immediately moved to the target pool by updating the accessed physical volume record to indicate the home pool 74 and the current pool 76 (FIG. 3) as the target pool. Otherwise, if physical volume i is not empty, control ends because a move initiated through the GUI panel 300 only moves empty physical volumes.

FIG. 9 illustrates a GUI panel 400 in which the administrator may enter a number of physical volumes 402 to move, the source pool 404 from which to move the physical volumes, the target pool 406 to which the selected number of physical volumes will be moved, and the media type 408 of the physical volumes to move. The GUI panel 400 may also include a status area 410 to display information on the status of moving physical volumes from the source to the target pool.

Figure 10:
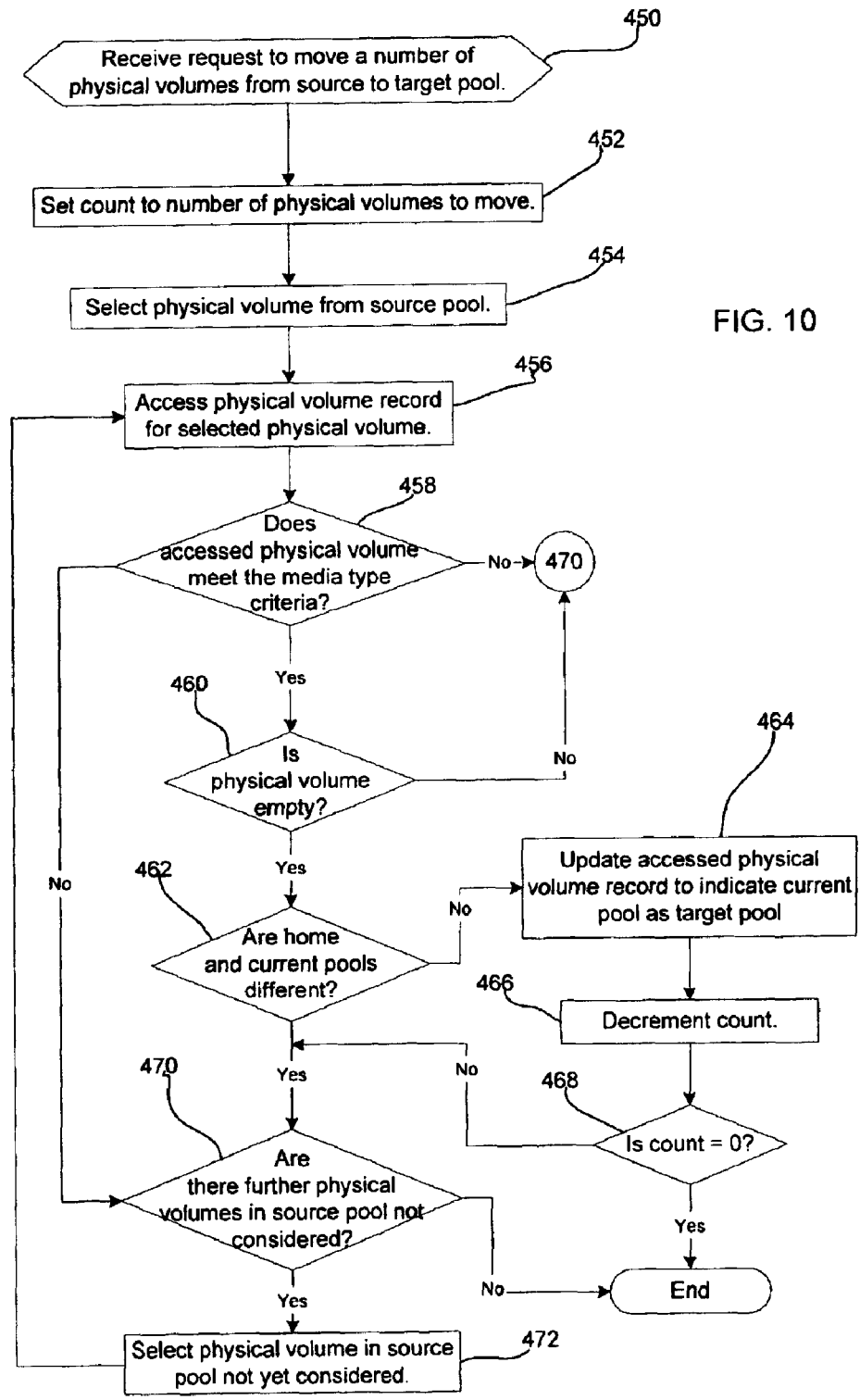

FIG. 10 illustrates logic implemented in the tape controller 10 to move a number of empty physical volumes from the source to the target pool that do not have to be returned to a home pool if the physical volumes were borrowed. Upon receiving (at block 450) the request to move the selected number of physical volumes, the tape controller 10 sets (at block 452) a count variable to the administrator specified number of physical volumes to move entered in field 402 of the GUI panel 400 (FIG. 9). The tape controller 10 selects (at block 454) a physical volume from the source pool and accesses (at block 456) the physical volume record 70 for the selected physical volume. If (at block 458) the media type indicated in media type field 70 of the accessed physical volume record does not meet the selected media type 408 criteria (FIG. 9), then control proceeds to block 470 to consider any further physical volumes in the source pool. Otherwise, if (at block 460) the media type criteria is met and the accessed physical volume is not empty, then control proceeds to block 470 to consider any further physical volumes. If (at block 460) the accessed physical volume is empty, then a determination is made if the empty tape was borrowed, i.e., whether the home 74 and current 76 pool fields in the accessed physical record differ. If the empty physical volume was not borrowed, i.e., the home 74 and current 76 pool fields are the same, then the physical volume record 70 for the selected source physical volume record is updated (at block 464) to assign the selected physical volume to the target pool 406 (FIG. 9) and the count is decremented (at block 466), indicating one less physical volume to move to the target pool. If (at block 468) the maximum number of physical volumes, as indicated by the count, has been moved, then control ends. Otherwise, if not all the requested physical volumes have been moved, then the tape controller 10 considers (at block 470) whether there are further physical volumes in the source pool not considered. If there are further physical volumes that may be considered, then the tape controller 10 selects (at block 472) one physical volume in the source pool 8a, 8b and returns to block 456. Otherwise, if there are no further physical volumes to consider, control ends.

If (at block 462) the accessed physical volume was borrowed, then control proceeds to block 470 to consider the next physical volume in the storage pool. In further implementations, an accessed physical volume that is borrowed may be moved to the target storage pool if the physical volume was borrowed and the home pool 74 has a return policy 96 (FIG. 2c) indicating that borrowed tapes do not have to be returned. Otherwise, if the return policy 96 for the home storage policy indicates that borrowed tapes must be returned, then control proceeds to block 470 to consider any further physical volumes in the source storage pool.

The described implementations provide techniques for moving physical volumes to different storage pools and handling reclamation when transferring physical volumes from one storage pool to another.

ADDITIONAL IMPLEMENTATION DETAILS

The described techniques for managing physical volumes in storage pools may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In described implementations, the physical volumes subject to the storage pool management operations were stored in tape cartridges. However, in alternative implementations, the physical volumes subject to the storage pool management operations may be stored in any non-volatile storage unit medium known in the art, including optical disks, hard disk drive, non-volatile Random Access Memory (RAM) devices, etc. In such alternative storage unit media, the server would include the necessary drives or interfaces through which data in the alternative storage unit component is accessed.

In the described implementations, certain variables, such as n and i are used to denote integer values indicating a certain number of elements. These variables may denote any number when used at different instances with the same or different elements.

The illustrated logic of FIGS. 4, 5, 6, 8, and 10 shows certain events occurring in a certain order. In alternative implementations, certain operations may be performed in a different order, modified or removed. Morever, steps may be added to the above described logic and still conform to the described implementations. Further, operations described herein may occur sequentially or certain operations may be processed in parallel. Yet further, operations may be performed by a single processing unit or by distributed processing units.

Figure 11:
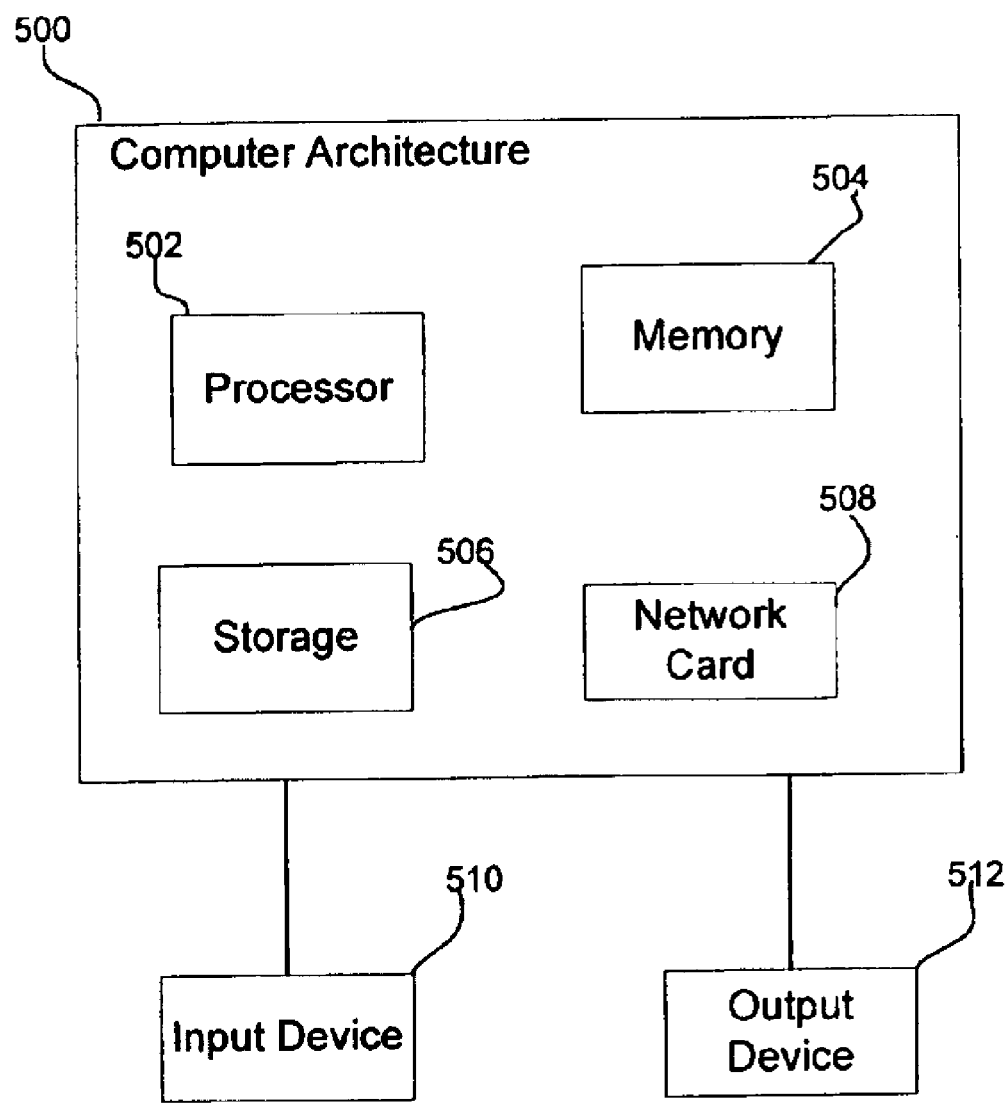
FIG. 11 illustrates an architecture of computing components in the computing environment, such as the hosts and tape server, and any other computing devices.

FIG. 11 illustrates one implementation of a computer architecture 500 that may be used in the hosts 4a, 4b . . . 4n and tape server 2 (FIG. 1). The architecture 500 may include a processor 502 (e.g., a microprocessor), a memory 504 (e.g., a volatile memory device), and storage 506 (e.g., a non-volatile storage, such as magnetic disk drives, optical disk drives, a tape drive, etc.). The storage 506 may comprise an internal storage device or an attached or network accessible storage. Programs in the storage 506 are loaded into the memory 504 and executed by the processor 502 in a manner known in the art. The architecture further includes a network card 508 to enable communication with a network. An input device 510 is used to provide user input to the processor 502, and may include a keyboard, mouse, pen-stylus, microphone, touch sensitive display screen, or any other activation or input mechanism known in the art. An output device 512 is capable of rendering information transmitted from the processor 502, or other component, such as a display monitor, printer, storage, etc.

The foregoing description of various implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer implemented method for managing storage units, comprising:

maintaining storage pool information indicating an assignment of a plurality of storage units to a plurality of storage pools, wherein each pool is assigned zero or more storage units, and wherein data associated with one storage pool is stored in at least one storage unit assigned to the storage pool;

receiving user selection to move at least one storage unit to a target storage pool;

determining at least one storage unit assigned to a source storage pool to move to the target storage pool;

determining whether the at least one selected storage unit includes active data; and updating the storage pool information to indicate the determined at least one selected storage unit having no active data as assigned to the target storage pool.

2. The method of claim 1, wherein the storage units associated with one storage pool include a class of data that is associated with the storage pool, and wherein the source and target storage pools are associated with different classes of data.

3. The method of claim 1, wherein receiving the user selection comprises receiving a list of storage units to assign to the target storage pool.

4. The method of claim 1, wherein the storage unit comprises a sequential access tape cartridge.

5. A computer implemented method for managing storage units, comprising:

maintaining storage pool information indicating an assignment of a plurality of storage units to a plurality of storage pools, wherein each pool is assigned zero or more storage units, and wherein data associated with one storage pool is stored in at least one storage unit assigned to the storage pool;

receiving user selection of a list of storage units to move to a target storage pool;

for each storage unit on the list, determining whether the storage unit includes active data;

updating the storage pool information to indicate that the storage unit is assigned to the target storage pool if the storage unit does not include active data; and if the storage unit does include active data, scheduling a reclaim operation to copy the active data from the storage unit to an available storage unit, wherein the storage pool information is updated to indicate that the storage unit is assigned to the target storage pool after the active data is copied from the storage unit to the available storage unit.

6. The method of claim 5, further comprising:

assigning the available storage unit to which the data was copied to the source storage pool.

7. A computer implemented method for managing storage units, comprising:

maintaining storage pool information indicating an assignment of a plurality of storage units to a plurality of storage pools, wherein each pool is assigned zero or more storage units, and wherein data associated with one storage pool is stored in at least one storage unit assigned to the storage pool;

receiving user selection to move at least one storage unit to a target storage pool;

determining at least one storage unit assigned to a source storage pool to move to the target storage pool;

updating the storage pool information to indicate the determined at least one selected storage unit as assigned to the target storage pool; and scheduling a reclaim operation with the source storage unit if the source storage unit includes active data.

8. The method of claim 7, further comprising:

determining whether user selection indicates a priority move; and performing the reclaim operation with respect to the source storage unit at a higher priority than other storage units being reclaimed during a scheduled reclaim period if the user selection indicates a priority move.

9. The method of claim 8, further comprising:

determining whether user selection indicates a priority move that overrides a restriction to perform reclaim operations during the scheduled reclaim period; and performing the reclaim operation with respect to the source storage unit independent of the regularly scheduled reclaim period if the user selection indicates the priority move that overrides the scheduled reclaim period restriction.

10. The method of claim 7, wherein the reclaim operation is scheduled to occur after a reclamation threshold has been reached.

11. A computer implemented method for managing storage units, comprising:

maintaining storage pool information indicating an assignment of a plurality of storage units to a plurality of storage pools, wherein each pool is assigned zero or more storage units, and wherein data associated with one storage pool is stored in at least one storage unit assigned to the storage pool;

receiving user selection to move at least one storage unit to a target storage pool;

determining at least one storage unit assigned to a source storage pool to move to the target storage pool, wherein the determined at least one storage unit to move includes storage units that are borrowed from a host storage pool having a return policy indicating that borrowed tapes do not have to be returned; and updating the storage pool information to indicate the determined at least one selected storage unit as assigned to the target storage pool.

12. A computer implemented method for reclaiming a storage unit, comprising:

selecting a source storage unit to reclaim to a target storage unit;

copying active data in the source storage unit to the target storage unit;

determining whether the source storage unit is subject to a move operation to move the source storage unit from a first storage pool to a second storage pool, wherein the first and second storage pools include storage units having active data; and indicating the source storage unit as in the second storage pool if the source storage unit is subject to the move operation.

13. The method of claim 12, wherein the storage units associated with one storage pool include a class of data that is associated with the storage pool, and wherein the first and second storage pools are associated with different classes of data.

14. The method of claim 12, further comprising:

if the source storage unit is not subject to a move operation, then determining whether the source storage unit was borrowed from a home storage pool; and associating the source storage unit with the home storage pool if the source storage unit was borrowed from the home storage pool.

15. The method of claim 14, further comprising:

determining whether the first storage pool has a minimum number of empty tapes if the source storage unit was borrowed, wherein the source storage unit is only associated with the home storage pool if the first storage pool has at least the minimum number of empty tapes.

16. A system for managing data, comprising:

a plurality of storage units;

means for maintaining storage pool information indicating an assignment of a plurality of storage units to a plurality of storage pools, wherein each pool is assigned zero or more storage units, and wherein data associated with one storage pool is stored in at least one storage unit assigned to the storage pool;

means for receiving user selection to move at least one storage unit to a target storage pool;

means for determining at least one storage unit assigned to a source storage pool to move to the target storage pool;

means for determining whether the at least one selected storage unit includes active data; and means for updating the storage pool information to indicate the determined at least one selected storage unit having no active data as assigned to the target storage pool.

17. The system of claim 16, wherein the storage units associated with one storage pool include a class of data that is associated with the storage pool, and wherein the source and target storage pools are associated with different classes of data.

18. A system for managing data, comprising:

a plurality of storage units;

means for maintaining storage pool information indicating an assignment of a plurality of storage units to a plurality of storage pools, wherein each pool is assigned zero or more storage units, and wherein data associated with one storage pool is stored in at least one storage unit assigned to the storage pool;

means for receiving user selection to move at least one storage unit to a target storage pool;

means for determining at least one storage unit assigned to a source storage pool to move to the target storage pool;

means for updating the storage pool information to indicate the determined at least one selected storage unit as assigned to the target storage pool; and means for scheduling a reclaim operation with the source storage unit if the source storage unit includes active data.

19. The system of claim 18, further comprising:

means for determining whether user selection indicates a priority move; and means for performing the reclaim operation with respect to the source storage unit at a higher priority than other storage units being reclaimed during a scheduled reclaim period if the user selection indicates a priority move.

20. A system for reclaiming data, comprising:

a storage unit;

means for selecting a source storage unit to reclaim to a target storage unit;

means for copying active data in the source storage unit to the target storage unit;

means for determining whether the source storage unit is subject to a move operation to move the source storage unit from a first storage pool to a second storage pool, wherein the first and second storage pools include storage units having active data; and means for indicating the source storage unit as in the second storage pool if the source storage unit is subject to the move operation.

21. The system of claim 20, further comprising:

means for determining whether the source storage unit was borrowed from a home storage pool if the source storage unit is not subject to a move operation; and means for associating the source storage unit with the home storage pool if the source storage unit was borrowed from the home storage pool.

22. The system of claim 21, further comprising:

means for determining whether the first storage pool has a minimum number of empty tapes if the source storage unit was borrowed, wherein the source storage unit is only associated with the home storage pool if the first storage pool has at least the minimum number of empty tapes.

23. A computer readable storage device including code for managing storage units, wherein the code is capable of causing operations to be performed, the operations comprising:

maintaining storage pool information indicating an assignment of a plurality of storage units to a plurality of storage pools, wherein each pool is assigned zero or more storage units, and wherein data associated with one storage pool is stored in at least one storage unit assigned to the storage pool;

receiving user selection to move at least one storage unit to a target storage pool;

determining at least one storage unit assigned to a source storage pool to move to the target storage pool;

determining whether the at least one selected storage unit includes active data; and updating the storage pool information to indicate the determined at least one selected storage unit having no active data as assigned to the target storage pool.

24. The code of claim 23, wherein the storage units associated with one storage pool include a class of data that is associated with the storage pool, and wherein the source and target storage pools are associated with different classes of data.

25. The code of claim 23, wherein receiving the user selection comprises receiving a list of storage units to assign to the target storage pool.

26. A computer readable storage device including code for managing storage units, wherein the code is capable of causing operations to be performed, the operations comprising:

maintaining storage pool information indicating an assignment of plurality of storage units to a plurality of storage pools, wherein each pool is assigned zero or more storage units, and wherein data associated with one storage pool is stored in at least one storage unit assigned to the storage pool;

receiving user selection of a list of storage units to move to a target storage pool;

for each storage unit on the list, determining whether the storage unit includes active data;

updating the storage pool information to indicate that the storage unit is assigned to the target storage pool if the storage unit does not include active data; and if the storage unit does include active data, scheduling a reclaim operation to copy the active data from the storage unit to an available storage unit, wherein the storage pool information is updated to indicate that the storage unit is assigned to the target storage pool after the active data is copied from the storage unit to the available storage unit.

27. The code of claim 26, further comprising: assigning the storage unit to which the data was copied to the source storage pool.

28. A computer readable storage device including code for managing storage units, wherein the code is capable of causing operations to be performed, the operations comprising:

maintaining storage pool information indicating an assignment of a plurality of storage units to a plurality of storage pools, wherein each pool is assigned zero or more storage units, and wherein data associated with one storage pool is stored in at least one storage unit assigned to the storage pool;

receiving user selection to move at least one storage unit to a target storage pool;

determining at least one storage unit assigned to a source storage pool to move to the target storage pool;

updating the storage pool information to indicate the determined at least one selected storage unit as assigned to the target storage pool; and scheduling a reclaim operation with the source storage unit if the source storage unit includes active data.

29. The code of claim 28, further comprising:

determining whether user selection indicates a priority move; and performing the reclaim operation with respect to the source storage unit at a higher priority than other storage units being reclaimed during a scheduled reclaim period if the user selection indicates a priority move.

30. The code of claim 29, further comprising:

determining whether user selection indicates a priority move that overrides a restriction to perform reclaim operations during the scheduled reclaim period;

performing the reclaim operation with respect to the source storage unit independent of the regularly scheduled reclaim period if the user selection indicates the priority move that overrides the scheduled reclaim period restriction.

31. The code of claim 28, wherein the reclaim operation is scheduled to occur after a reclamation threshold has been reached.

32. A computer readable storage device including code for managing storage units, wherein the code is capable of causing operations to be performed, the operations comprising:

maintaining storage pool information indicating an assignment of a plurality of storage units to a plurality of storage pools, wherein each pool is assigned zero or more storage units, and wherein data associated with one storage pool is stored in at least one storage unit assigned to the storage pool;

receiving user selection to move at least one storage unit to a target storage pool;

determining at least one storage unit assigned to a source storage pool to move to the target storage pool, wherein the determined at least one storage unit to move includes storage units that are borrowed from a host storage pool having a return policy indicating that borrowed tapes do not have to be returned; and updating the storage pool information to indicate the determined at least one selected storage unit as assigned to the target storage pool.

33. The code of claim 23, wherein the storage unit comprises a sequential access tape cartridge.

34. A computer readable storage device including code for reclaiming a storage unit, wherein the code causes operations to be performed, the operations comprising:

selecting a source storage unit to reclaim to a target storage unit;

copying active data in the source storage unit to the target storage unit;

determining whether the source storage unit is subject to a move operation to move the source storage unit from a first storage pool to a second storage pool, wherein the first and second storage pools include storage units having active data; and indicating the source storage unit as in the second storage pool if the source storage unit is subject to the move operation.

35. The code of claim 34, wherein the storage units associated with one storage pool include a class of data that is associated with the storage pool, and wherein the first and second storage pools are associated with different classes of data.

36. The code of claim 34, further comprising:

if the source storage unit is not subject to a move operation, then determining whether the source storage unit was borrowed from a home storage pool; and associating the source storage unit with the home storage pool if the source storage unit was borrowed from the home storage pool.

37. The code of claim 34, further comprising:

determining whether the first storage pool has a minimum number of empty tapes if the source storage unit was borrowed, wherein the source storage unit is only associated with the home storage pool if the first storage pool has at least the minimum number of empty tapes.

* * * * *